US012786764B2

(12) United States Patent
Schober et al.

(10) Patent No.: US 12,786,764 B2

(45) Date of Patent: Nov. 3, 2026

(54) PAGING

(71) Applicant: Nordic Semiconductor ASA, Trondheim (NO)

(72) Inventors: Karol Schober, Oulu (FI); Mauri Nissilä, Oulu (FI)

(73) Assignee: Nordic Semiconductor ASA, Trondheim (NO)

( * ) Notice: Subject to any disclaimer, the term of this patent is extended or adjusted under 35 U.S.C. 154(b) by 295 days.

(21) Appl. No.: 18/294,394

(22) PCT Filed: Aug. 3, 2022

(86) PCT No.: PCT/EP2022/071866

§ 371 (c)(1),
(2) Date: Feb. 1, 2024

(87) PCT Pub. No.: WO2023/012235

PCT Pub. Date: Feb. 9, 2023

(65) Prior Publication Data

US 2024/0292246 A1 Aug. 29, 2024

(30) Foreign Application Priority Data

Aug. 4, 2021 (GB) ...................................... 2111246

(51) Int. Cl.

*H04W 24/08* (2009.01)
*H04L 5/00* (2006.01)
*H04W 68/02* (2009.01)

(52) U.S. Cl.

CPC ........... *H04W 24/08* (2013.01); *H04L 5/0007* (2013.01); *H04L 5/0051* (2013.01); *H04W 68/02* (2013.01)

(58) Field of Classification Search

CPC . H04W 24/08; H04W 68/02; H04W 52/0216; H04W 68/005; H04W 68/025;

(Continued)

(56) References Cited

U.S. PATENT DOCUMENTS 11,297,569 B2 * 4/2022 Nam ................. H04W 52/0216
12,114,287 B2 * 10/2024 Xu ........................... H04L 5/005

(Continued)

FOREIGN PATENT DOCUMENTS

EP 2 453 710 B1 10/2013
WO WO 2018/129319 A1 7/2018

(Continued)

OTHER PUBLICATIONS

International Search Report and Written Opinion for PCT/EP2022/071866, mailed Nov. 7, 2022, 14 pages.

(Continued)

*Primary Examiner* — Brian T O Connor

(74) *Attorney, Agent, or Firm* — Klarquist Sparkman, LLP

(57) ABSTRACT

A radio transmitter device for transmitting radio signals according to an orthogonal frequency division multiplexing protocol using a plurality of frequency resources is provided. The radio transmitter device is configured to transmit a plurality of reference signals within a first subset of said plurality of frequency resources at a first monitoring occasion and a second monitoring occasion and transmit paging information within a second subset of said plurality of frequency resources at one or more of the first and second monitoring occasions, wherein the first subset has a larger frequency span than the second subset.

20 Claims, 5 Drawing Sheets

(58) Field of Classification Search
CPC .... H04W 72/23; H04L 5/0007; H04L 5/0051; H04L 5/0053; H04L 5/0001; H04L 5/0094; H04L 1/1812; H04L 1/1845; H04L 1/1893; H04L 1/1896; H04L 1/08; H04L 5/0078
See application file for complete search history.

(56) References Cited

U.S. PATENT DOCUMENTS

| | | | | |
|---|---|---|---|---|
| 12,126,478 | B2 * | 10/2024 | Sosnin | H04L 5/0032 |
| 12,273,875 | B2 * | 4/2025 | Islam | H04W 72/23 |
| 12,446,002 | B2 * | 10/2025 | Wu | H04L 5/0094 |
| 2016/0227502 | A1 | 8/2016 | Vos et al. | |
| 2020/0112917 | A1 * | 4/2020 | Nam | H04W 52/0216 |
| 2022/0330061 | A1 * | 10/2022 | Zewail | H04W 24/08 |
| 2023/0023161 | A1 * | 1/2023 | Liu | H04W 24/08 |
| 2023/0189150 | A1 * | 6/2023 | Hsieh | H04W 52/0229 370/311 |
| 2023/0276362 | A1 * | 8/2023 | Reial | H04W 56/0015 370/311 |
| 2023/0337180 | A1 * | 10/2023 | Park | H04W 68/005 |
| 2023/0345414 | A1 * | 10/2023 | Xu | H04W 68/025 |
| 2024/0039669 | A1 * | 2/2024 | Koskela | H04L 5/0094 |
| 2024/0080802 | A1 * | 3/2024 | Wu | H04L 5/0094 |
| 2024/0187187 | A1 * | 6/2024 | Jung | H04L 5/0051 |
| 2024/0187988 | A1 * | 6/2024 | Maleki | H04W 52/0216 |
| 2024/0259998 | A1 * | 8/2024 | Peng | H04B 7/0626 |
| 2024/0284354 | A1 * | 8/2024 | Liu | H04W 56/001 |
| 2025/0193716 | A1 * | 6/2025 | Chatterjee | H04W 24/08 |

FOREIGN PATENT DOCUMENTS

| | | | |
|---|---|---|---|
| WO | WO 2018/175442 | A1 | 9/2018 |
| WO | WO 2019/064236 | A2 | 4/2019 |
| WO | WO 2020/065124 | A1 | 4/2020 |
| WO | WO 2020/216242 | A1 | 10/2020 |

OTHER PUBLICATIONS

IPO Combined Search and Examination Report under Sections 17 and 18(3) for Great Britain Application No. 2111246.1, dated Jan. 17, 2022, 7 pages.

* cited by examiner

PAGING

CROSS REFERENCE TO RELATED APPLICATIONS

This is the U.S. National Stage of International Application No. PCT/EP2022/071866, filed Aug. 3, 2022, which was published in English under PCT Article 21(2), which in turn claims the benefit of Great Britain Application No. 2111246.1, filed Aug. 4, 2021.

TECHNICAL FIELD

The present invention relates to paging for use in a radio communications system, particularly though not exclusively a cellular communications system, such as a 5G "New Radio" system.

BACKGROUND TO THE INVENTION

Throughout the course of the past few decades, the extent and technical capabilities of cellular-based radio communication systems have expanded dramatically. A number of different cellular-based networks have been developed over the years, including the Global System for Mobile Communications (GSM), General Packet Radio Services (GPRS), Enhanced Data rates for GSM Evolution (EDGE), and Universal Mobile Telecommunications System (UMTS), where GSM, GPRS, and EDGE are often referred to as second generation (or "2G") networks and UMTS is referred to as a third generation (or "3G") network.

The Long Term Evolution (LTE) network, a fourth generation (or "4G") network standard specified by the 3$^{rd}$ Generation Partnership Project (3GPP), gained popularity due to its relatively high uplink and downlink speeds and larger network capacity compared to earlier 2G and 3G networks.

More recently, 3GPP have published fifth generation (or "5G") network standards. At the time of filing, the most recent release of the 5G standard is Release 16 (R16), and work on Release 17 (R17) is currently underway. In general, the radio technology is referred to as "New Radio" (NR).

From a communications perspective, certain standards from 4G onwards use orthogonal frequency division multiple access (OFDMA) as the basis for allocating network resources, at least in the downlink. This allows the available bandwidth between to be shared between user equipment (UE) that accesses the network in a given cell, provided by a base station, referred to in NR as a "Next Generation NodeB" or simply "gNB". OFDMA is a multi-user variant of orthogonal division multiplexing (OFDM), a multiplexing scheme in which the total bandwidth is divided into a number of non-overlapping sub-bands, each having its own sub-carrier frequency. In OFDM, unlike other frequency division multiplexing (FDM) schemes, each of these subcarriers are orthogonal to one another such that cross-talk between sub-bands is ideally eliminated and removing the need for inter-carrier guard bands. In the uplink, NR supports cyclic prefix OFDMA (CP-OFDMA) in addition to SC-FDMA that has been exclusive PUSCH waveform in 4G.

In NR, the physical layer may be described as a resource grid divided into physical resource elements which correspond to one sub-carrier in one OFDM symbol. A physical resource block (PRB) spans 12 sub-carriers. In the time domain, 14 OFDM symbols forms a slot. A Radio Frame is 10 ms long, and a subframe is 1 ms. The duration of a slot is dependent on the spacing of sub-carriers, with various options possible within the NR standard ranging from 10 slots per frame to 160 slots per frame.

At the physical layer, data and control messages are carried in various physical channels. One such channel is the physical downlink control channel (PDCCH). The PDCCH dynamically sends control information to the UE, which the UE uses to determine when and at what frequencies downlink data is to be received via the physical downlink shared channel (PDSCH), along with how this data is to be demodulated/decoded. The PDCCH also sends control information on when and where (i.e. at what frequencies) to assemble and send uplink data on the physical uplink shared channel (PUSCH). The information carried by the PDCCH is downlink control information (DCI).

A PDCCH payload is mapped to a Control Resource Set (CORESET) of physical resources (i.e. a defined section of the resource grid). For instance, an example CORESET may be two OFDM symbols long and 24 PRBs wide in frequency. A resource element group (REG) is defined as one PRB in one OFDM symbol. The CORESET is split into eight control channel elements (CCEs) each comprising six REGs.

The PDCCH payload is mapped to one or more logically contiguous CCEs in the CORESET. The PDCCH typically does not occupy the entire CORESET allocation, and may for instance be mapped to only one or two of the CCEs within the CORESET. Nine resources elements of each REG used by the PDCCH contain payload data and three resource elements contain demodulation reference symbols (DMRS). DMRS are used for channel estimation by the UE.

The UE obtains the PDCCH control information by monitoring a predefined search space associated with the relevant CORESET at a designated monitoring occasion. This process is implemented by performing so-called blind decoding for a set of PDCCH candidates in a predefined search space, whereby decoding is attempted without knowing the transmission characteristics.

To save power, when not actively communicating with a gNB, the UE operates in lower power Radio Resource Control (RRC) IDLE and INACTIVE modes. In these modes the UE may utilise Discontinuous Reception (DRX) and extended DRX (eDRX) to monitor for paging messages, which indicate that there is downlink data for the UE to receive. The UE wakes up to monitor one brief paging occasion (PO) per DRX cycle, within a Paging Time Window of an eDRX cycle, if eDRX is configured. A PO is a set of PDCCH monitoring occasions and can consist of multiple time slots (e.g. a subframe or OFDM symbol) where a paging DCI can be sent (as specified in technical specification TS 38.213).

In multi-beam operations, the UE assumes that the same paging message is repeated in all transmitted beams and thus the selection of the beam(s) for the reception of the paging message is up to UE implementation.

To receive a paging message, the UE must be synchronised with the network. Synchronisation signal (SS) blocks are received by the UE prior to a PO to allow it to regain frequency and timing synchronisation with the base station, before the UE checks for a paging message in the PO. However, a cell-edge UE may require up to 3 SSB-burst cycles (e.g. 60 ms) before it is sufficiently synchronised to receive a paging message. The UE thus has to wake up for a relatively long period of time ahead of each DRX cycle, even if no paging message is transmitted.

It has been proposed to send a paging early indication (PEI) as an early indication of whether a paging message is present in a forthcoming PO, allowing the UE to return to a lower power mode earlier if there is no paging message. Various approaches for a PEI have been proposed but there remains a desire for improvements in this area.

SUMMARY OF THE INVENTION

When viewed from a first aspect, the present invention provides a radio transmitter device for transmitting radio signals according to an orthogonal frequency division multiplexing protocol using a plurality of frequency resources, wherein the radio transmitter device is configured to:

transmit a plurality of reference signals within a first subset of said plurality of frequency resources at a first monitoring occasion and a second monitoring occasion; and transmit paging information within a second subset of said plurality of frequency resources at one or more of the first and second monitoring occasions, wherein the first subset has a larger frequency span than the second subset.

When viewed from a second aspect, the present invention provides a method of operating a radio transmitter device for transmitting radio signals according to an orthogonal frequency division multiplexing protocol using a plurality of frequency resources, the method comprising:

transmitting a plurality of reference signals within a first subset of said plurality of frequency resources at a first monitoring occasion and a second, later, monitoring occasion;

transmitting paging information within a second subset of said plurality of frequency resources at one or more of the first and second monitoring occasions, wherein the first subset has a larger frequency span than the second subset.

Thus, it will be seen by those skilled in the art that, in accordance with the invention, transmitting reference signals in a subset of having a larger frequency span (i.e. wide-band signals) at the first and second monitoring occasions increases the ability of a corresponding radio receiver device to detect the reference signals, even if the receiver is not perfectly synchronised with the radio transmitter. The wide-band reference signals may then, for instance, be used to facilitate detection of the paging information transmitted in the second subset of frequency resources.

Those skilled in the art will recognise that it is unconventional to transmit wide-band reference signals as part of a paging process, because this would typically be expected to unnecessarily contaminate the spectrum and risk interfering with other radio receiver devices. However, the inventors have recognised that this may be acceptable in this case as paging is generally short and infrequent.

When viewed from a third aspect, the present invention provides a radio receiver device for receiving radio signals according to an orthogonal frequency division multiplexing protocol using a plurality of frequency resources, wherein the radio receiver device is configured to:

detect a plurality of reference signals in a first subset of the plurality of frequency resources at a first monitoring occasion and a second, later, monitoring occasion monitor for paging information in a second subset of the plurality of frequency resources at one or more of the first and second monitoring occasions, wherein the first subset has a larger frequency span than the second subset; and use detected reference signals at the first and second monitoring occasions to synchronise the radio receiver device.

When viewed from a fourth aspect, the present invention provides a method of operating a radio receiver device for receiving radio signals according to an orthogonal frequency division multiplexing protocol using a plurality of frequency resources, said method comprising:

detecting a plurality of reference signals in a first subset of the plurality of frequency resources at a first monitoring occasion and a second, later, monitoring occasion monitoring for paging information in a second subset of the plurality of frequency resources at one or more of the first and second monitoring occasions, wherein the first subset has a larger frequency span than the second subset; and using detected reference signals at the first and second monitoring occasions to synchronise the radio receiver device.

The invention extends to a radio receiver configured to receive radio signals transmitted from a radio transmitter device as disclosed herein, i.e. forming a radio communications system.

When viewed from a fifth aspect, the present invention provides a method of communication between a radio transmitter device and a radio receiver device using an orthogonal frequency division multiplexing protocol using a plurality of frequency resources, said method comprising:

the radio transmitter device transmitting a plurality of reference signals within a first subset of said plurality of frequency resources at a first monitoring occasion and a second monitoring occasion; and the radio transmitter device transmitting paging information within a second subset of said plurality of frequency resources at one or more of the first and second monitoring occasions, wherein the first subset has a larger frequency span than the second subset;

the radio receiver device detecting the plurality of reference signals at the first and second monitoring occasions;

the radio receiver device detecting the paging information; and the radio receiver device using detected reference signals at the first and second monitoring occasions to synchronise the radio receiver device.

As mentioned above, because the reference signals are transmitted in a subset of frequency resources having a larger span than those carrying the paging information, the radio receiver device can detect the reference signals even if the synchronisation of the radio receiver device is not sufficiently accurate for immediate detection of the paging information. In some embodiments, synchronising the radio receiver device is done (i.e. using the detected reference signals at the first and second monitoring occasions) to facilitate the detection of the paging information. However, even if the radio receiver device is sufficiently synchronised to detect the paging information immediately, the detected reference signals at the first and second monitoring occasions may still provide an additional synchronisation aid that can be used to further improve the synchronization of the radio receiver device for future communications (e.g. the reception of a paging message comprising paging PDCCH or paging PDSCH). Thus in some embodiments synchronising the radio receiver device is done (i.e. using the detected reference signals at the first and second monitoring occasions) to facilitate subsequent radio communications.

The inclusion of wide-band reference signals at the first and second monitoring occasions offers an additional synchronization signal for the radio receiver device. Furthermore, because the reference signals are simply provided in addition to the paging information, they do not negatively impact legacy radio receiver devices communicating with the radio transmitter device which are, for instance, only configured to detect the paging information in the second subset of frequency resources.

The plurality of frequency resources may comprise a plurality of frequency bands (e.g. sub-carrier frequencies). In such embodiments the frequency span of the first or second subset comprises the difference in frequency between highest and lowest frequency bands of the subset. The size of the frequency span may be independent of the actual number or density of frequency resources comprising each subset. For instance, in some embodiments the first subset may comprise fewer frequency bands than the second subset. The frequency resources comprising the first and/or second subset may not be contiguous, e.g. they may be interleaved.

In some sets of embodiments, the reference signals and/or the paging information are transmitted at the first and/or second monitoring occasions using a plurality of time and frequency resources, e.g. a resource grid of physical resource elements which correspond to one frequency resource (e.g. one sub-carrier) in one time interval (e.g. one OFDM symbol). These time and frequency resources may be allocated to the reference signals and the paging information as needed (so long as the first subset of frequency resources has a larger frequency span than the second subset).

In some embodiments, synchronising the radio receiver device may comprise estimating a timing offset, i.e. a timing error of the radio receiver device relative to a radio transmitter device. Additionally or alternatively, synchronising the radio receiver device may comprise estimating a frequency offset, i.e. a frequency error of the radio receiver device relative to a radio transmitter device. Timing and/or frequency errors may, for instance, be caused by local oscillator drift and/or Doppler effects due to a moving transmitter and/or receiver. Estimating a timing error may comprise measuring a phase shift between reference signals in different frequency resources at a single monitoring occasion. Estimating a frequency error may comprise measuring a phase shift between reference signals in the first and second monitoring occasions.

The reference signals are transmitted in both the first and second monitoring occasions. However, in some embodiments the paging information may be transmitted in only one of the first and second monitoring occasions. In other embodiments the paging information is also transmitted in both the first and second monitoring occasions. In such embodiments the radio transmitter device may be configured to transmit substantially the same signals at the first and second monitoring occasions.

In some sets of embodiments, the orthogonal frequency division multiplexing protocol comprises the 5G "New Radio" standard. The radio transmitter device may comprise a Next Generation NodeB (gNB). The radio receiver device may comprise a User Equipment (UE). The plurality of frequency resources may comprise a plurality of sub-carrier frequencies. The frequency resources may be evenly spaced, e.g. with a spacing of 15 kHz, 30 kHz, 60 kHz, 120 kHz or 240 kHz. The first and/or second monitoring occasion may comprise one or more OFDM symbols.

In some embodiments, the first and second monitoring occasions are separated in time by a predetermined number of OFDM symbols. Preferably, the first and second monitoring occasions are separated by four or more OFDM symbols. The first and second monitoring occasions are preferably separated by no more than 14 OFDM symbols. The number of OFDM symbols separating the first and second monitoring occasions may determine the degree of frequency offset the radio receiver device can correct using the reference signals (this may be referred to as a "frequency acquisition range"). The frequency acquisition range $f_0$ may be determined according to $f_0=1/2T'$ where T is the time separation between monitoring occasions. For instance, for a separation of 14 OFDM symbols, a sub-carrier spacing (SCS) of 15 kHz and a slot length of 1 ms, the frequency acquisition range is ±500 Hz (i.e. 0.5 ppm at 1 GHZ). This means that for a 15 kHz sub-carrier spacing a residual frequency offset of up to 1000 Hz can be corrected using reference signals in two monitoring occasions separated by 14 OFDM symbols. The frequency acquisition range increases linearly with sub-carrier spacing. For instance, for a separation of 14 OFDM symbols, a sub-carrier spacing (SCS) of 30 kHz and a slot length of 0.5 ms, the frequency acquisition range is ±1000 Hz (i.e. 2000 Hz).

The paging information may comprise a paging early indication (PEI) comprising information regarding a subsequent paging message, e.g. providing an early indication that a paging message is imminent. Thus the paging information may comprise information regarding the presence of a paging message at a subsequent time. Alternatively, the paging information may comprise a paging message itself.

In embodiments where the paging information comprises a PEI, the radio receiver device may be arranged to wake from a low power mode (e.g. an IDLE mode) to monitor for the PEI in the first and/or second monitoring occasions. If the radio receiver device does not detect the PEI in the first or second monitoring occasion it may return to the low power mode. If the radio receiver device does detect the PEI, the radio receiver may remain awake and proceed to monitor for the subsequent paging message if the PEI indicates so. As mentioned above, in some cases (e.g. due to synchronisation errors), the radio receiver may detect the reference signals but not the PEI, in which case the radio receiver device uses the detected reference signals to synchronise the radio receiver device, and then uses the improved synchronisation to detect the PEI. If no PEI and no reference signals are detected, the radio receiver device may return immediately to the low power mode.

In some embodiments, the PEI comprises sub-group identification information, i.e. identifying a sub-group of the receivers that are located within range of the transmitter for which the subsequent paging message is intended. Including sub-group identification information within the PEI ensures that only those radio receivers of the relevant sub-group wake to receive the subsequent paging message, saving power for the rest of the group. Thus a receiver may detect a PEI which indicates that no subsequent paging message is present for that receiver's sub-group, so the receiver may return to sleep. Some conventional approaches to PEI rely on sequence-based indications (e.g. tracking reference signal (TRS) or secondary synchronisation signal (SSS) approaches), which have a more limited capability to support sub-group identification.

In some embodiments, the radio receiver device detects whether the PEI indicates that a subsequent paging message is intended for the radio receiver device. If the PEI indicates that a subsequent paging message is intended for the radio receiver device, the radio receiver device may go on to detect the subsequent paging message. If the PEI indicates that a subsequent paging message is not intended for the radio receiver device, the radio receiver device may return to a low power state (e.g. an IDLE state) without detecting the subsequent paging message.

In some sets of embodiments, the paging information comprises a physical downlink control channel (PDCCH) payload, i.e. comprising downlink control information (DCI). In such embodiments the second subset of frequency resources may be within a control resource set (CORESET, e.g. CORESET #0 of the 5G NR standard). The paging information may be mapped to one or more logically contiguous control channel elements (CCEs) in the CORESET corresponding to one PDCCH candidate. The second subset of frequency resources may not span the whole CORESET. In such embodiments the radio receiver device may be configured to monitor a search space to detect the paging information (e.g. a common search space such as CSS #0 for CORESET #0) in the associated CORESET. Monitoring the search space may comprise performing blind decoding/detection of a set of PDCCH candidates.

Using PDCCH for the paging information in combination with wide-band reference signals provides benefits associated with PDCCH such as payload flexibility or the ability to multiplex with other PDCCH in the same CORESET for other radio receiver devices, whilst also providing a synchronization aid with the reference signals.

In embodiments where the paging information comprises a PEI, it may indicate the subsequent paging message comprises a physical downlink shared channel (PDSCH) payload or a physical downlink control channel (PDCCH) payload.

The plurality of reference signals may comprise demodulation reference symbols (DMRS). The first subset of frequency resources may be within a CORESET. The radio receiver device may thus be configured to monitor a search space (e.g. a common search space such as CSS #0) corresponding to the CORESET to detect the reference signals. In relevant embodiments this may be the same CORESET as that used by the paging information (i.e. the first and second subsets of frequency resources may be within the same control resource set).

The first and second subsets of frequency resources may be distinct, but in some embodiments there is some overlap between the first and second subsets of frequency resources. For instance, in one embodiment the second subset comprises one or more logically contiguous CCEs in a CORESET, and the first subset comprises all of the CCEs of the CORESET. For instance, where the paging information comprises a PDCCH payload, some of the reference signals may comprise DMRS within the PDCCH payload CCEs.

In some embodiments, the radio transmitter device is configured to transmit radio signals in a plurality of beams. In some embodiments, the radio transmitter device may be configured to transmit radio signals (e.g. the plurality of reference signals and the paging information) for each of the plurality of beams (i.e. with first and second monitoring occasions for each of the plurality of beams). The radio transmitter device may be configured to transmit radio signals in each of the plurality of beams sequentially. For instance, the radio transmitter device may be arranged to transmit a monitoring burst comprising first and second monitoring occasions for a first beam and subsequent first and second monitoring occasions for a second beam. Correspondingly, in some embodiments the radio receiver device is arranged to monitor first and second monitoring occasions for each of a plurality of beams.

Features of any aspect or embodiment described herein may, wherever appropriate, be applied to any other aspect or embodiment described herein. Where reference is made to different embodiments, it should be understood that these are not necessarily distinct but may overlap.

DETAILED DESCRIPTION

One or more non-limiting examples will now be described, by way of example only, and with reference to the accompanying figures in which:

FIG. 1 shows a radio communications system 100 comprising a gNB 102 configured to communicate with a UE 104. The radio communication system 100 operates according to the 5G New Radio standard, i.e. an orthogonal frequency division multiplexing protocol using a plurality of frequency bands.

To save power, the UE 104 does not communicate continuously with the gNB 102. Instead, the UE 104 follows a discontinuous reception (DRX) cycle, wherein the UE 104 wakes periodically from a low power IDLE mode to check for paging messages from the gNB 102.

As explained in more detail below, the gNB 102 provides a paging early indication (PEI) prior to a paging message to allow the power consumption of the UE 104 to be reduced. When the UE 104 wakes from the low power IDLE mode prior to a predetermined paging occasion it checks for a PEI. If a PEI is detected, the UE 104 proceeds to monitor for the subsequent paging message. However, if no PEI is detected the UE 104 returns to the IDLE mode without attempting to detect a full a paging message, reducing power consumption.

Figure 1:
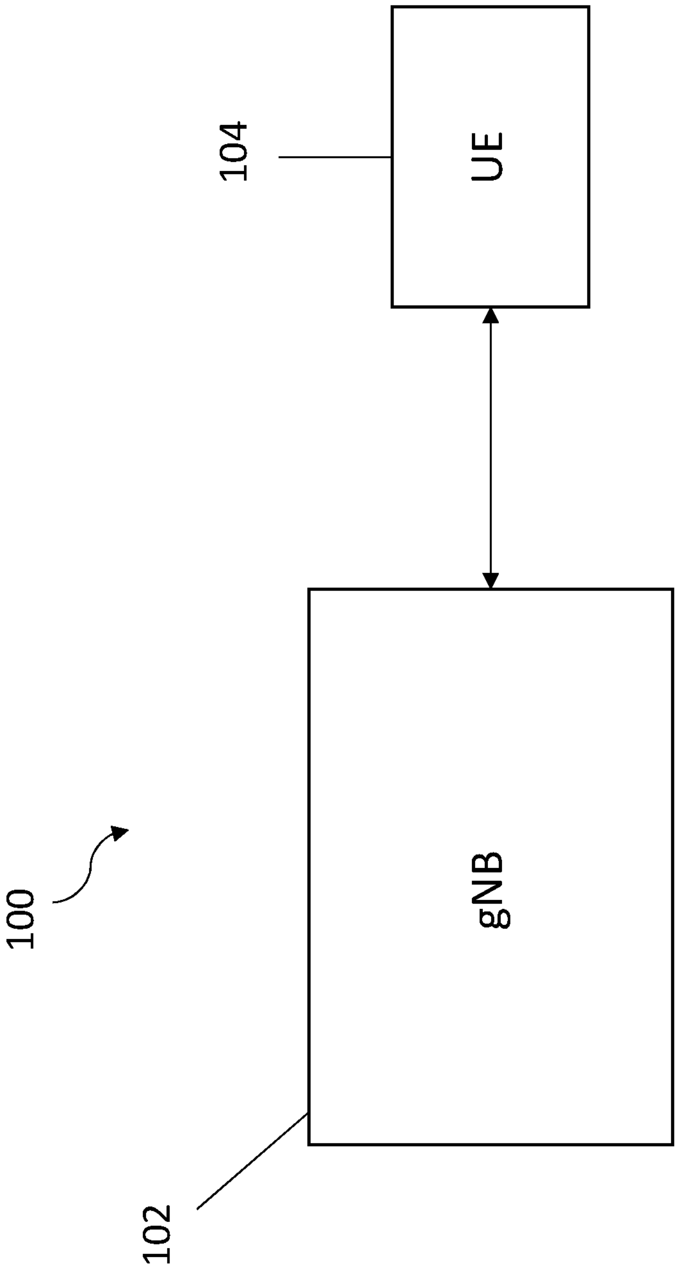
FIG. 1 is a schematic block diagram of a radio communications system according to an embodiment of the present invention.
Figure 2:
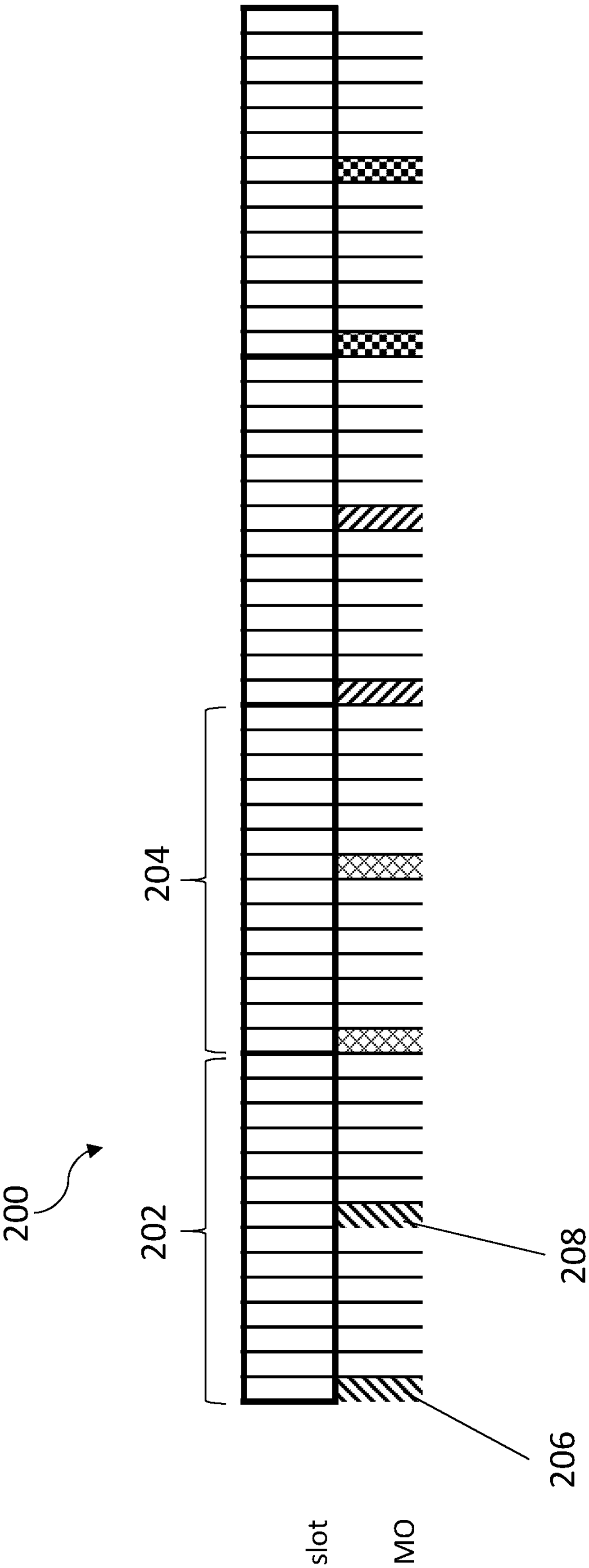
FIG. 2 is a diagram showing a PEI monitoring burst used in an embodiment of the present invention.

Additional reference is made to FIG. 2 which is a schematic timing diagram of a PEI monitoring burst 200 transmitted by the gNB 102 prior to a paging message. The burst 200 comprises four slots, each comprising fourteen OFDM symbols. The gNB 102 transmits in several different beams, and each slot is associated with a different beam. For instance, in a first slot 202 the gNB 102 transmits in a first beam, and in the second slot 204 the gNB 102 transmits in a second beam.

The PEI monitoring burst 200 comprises two monitoring occasions in each slot. The UE 104 monitors these monitoring occasions for a PEI. By way of example, the first slot 202 (for the first beam) comprises a first monitoring occasion 206 and a later second monitoring occasion 208. The first and second monitoring occasions 206, 208 are separated by seven OFDM symbols.

The gNB 102 transmits the PEI monitoring burst 200 using the physical downlink control channel (PDCCH). Additional reference is made to FIG. 3 which is a schematic diagram of a CORESET 300 used for transmitting the PEI at the first and second monitoring occasions 206, 208. In this example, the gNB 102 transmits the same content in the first and second monitoring occasions 206, 208, but this is not essential.

The CORESET 300 is two OFDM symbols long and twenty four PRBs wide in frequency (with 12 sub-carriers per PRB). The monitoring occasions 206, 208 illustrated in FIG. 2 are shown as only one symbol long because they simply denote the start of the CORESET 300. In other examples CORESETS which are one, two or three symbols long may be used. For simplicity the CORESET 300 in this example is not interleaved, although this is not essential. A resource element group (REG) is defined as one PRB in one OFDM symbol. The CORESET 300 is split into eight control channel elements (CCEs) 307 each comprising each six REGs 308.

Figure 3:
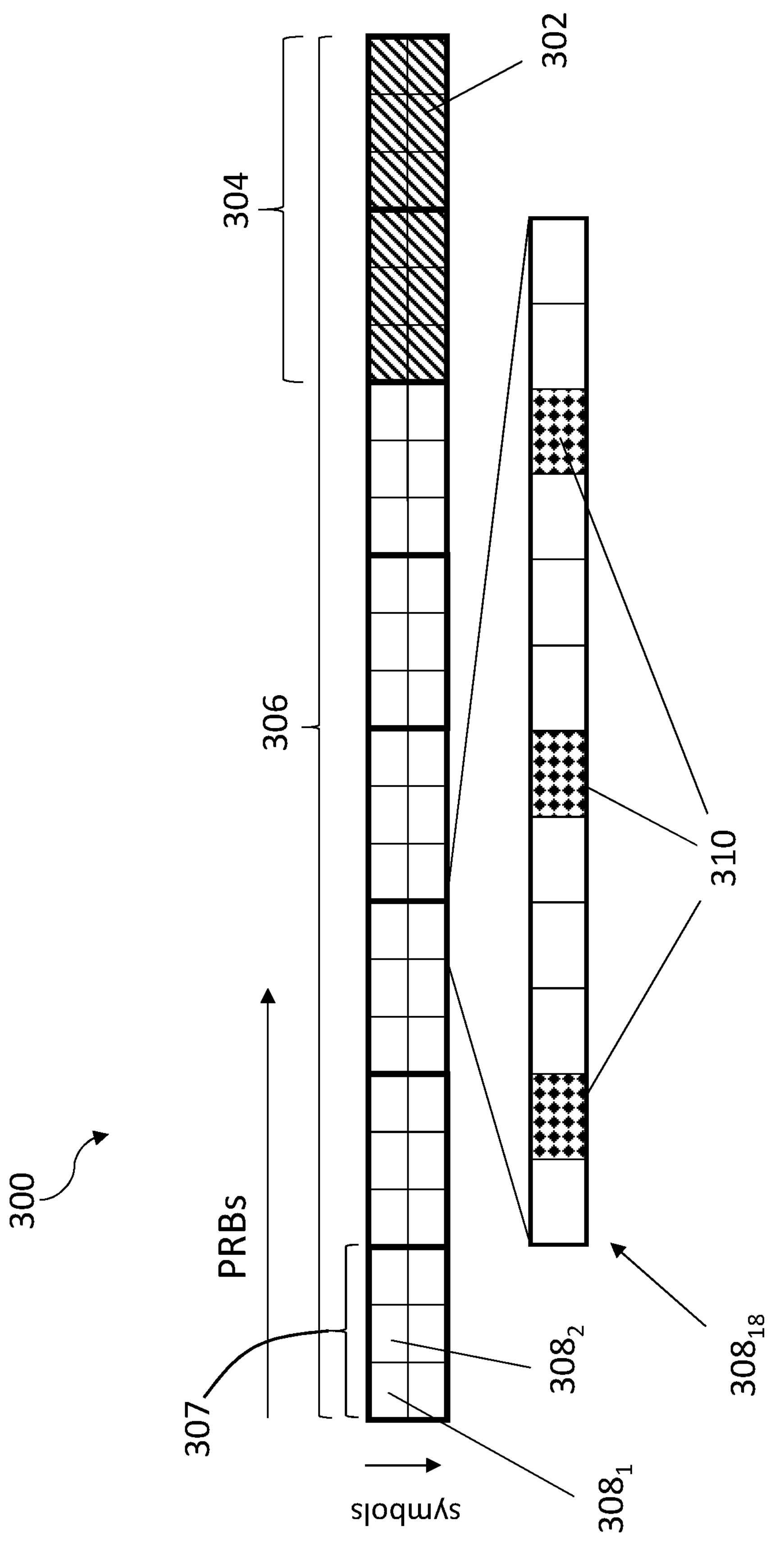
FIG. 3 shows the structure of a CORESET used in an embodiment of the present invention.

The gNB 102 transmits DMRS symbols 310 throughout all of the CCEs of the CORESET 300, i.e. in a first subset of frequency bands 306 that spans the whole CORESET 300. An expanded view of one example REG 308 is shown in FIG. 3 which illustrates that DMRS symbols 310 are transmitted in the second, sixth and tenth resource element of each REG.

Along with the DMRS symbols 310, the gNB 102 also transmits a PEI using a PDCCH payload 302 in two CCEs representing a second subset of frequency bands 304. No PDCCH payload is transmitted in any of the other CCEs of the CORESET 300. The PDCCH payload 302 comprises information on the upcoming paging message, including sub-group identification information identifying a sub-group of UEs for which the subsequent paging message is intended. It can be seen in FIG. 3 that the first subset of frequency bands 306 has a larger frequency span than the second subset of frequency bands 304. In other words, DMRS symbols are present in more PRBs than PDCCH payload itself.

Figure 4:
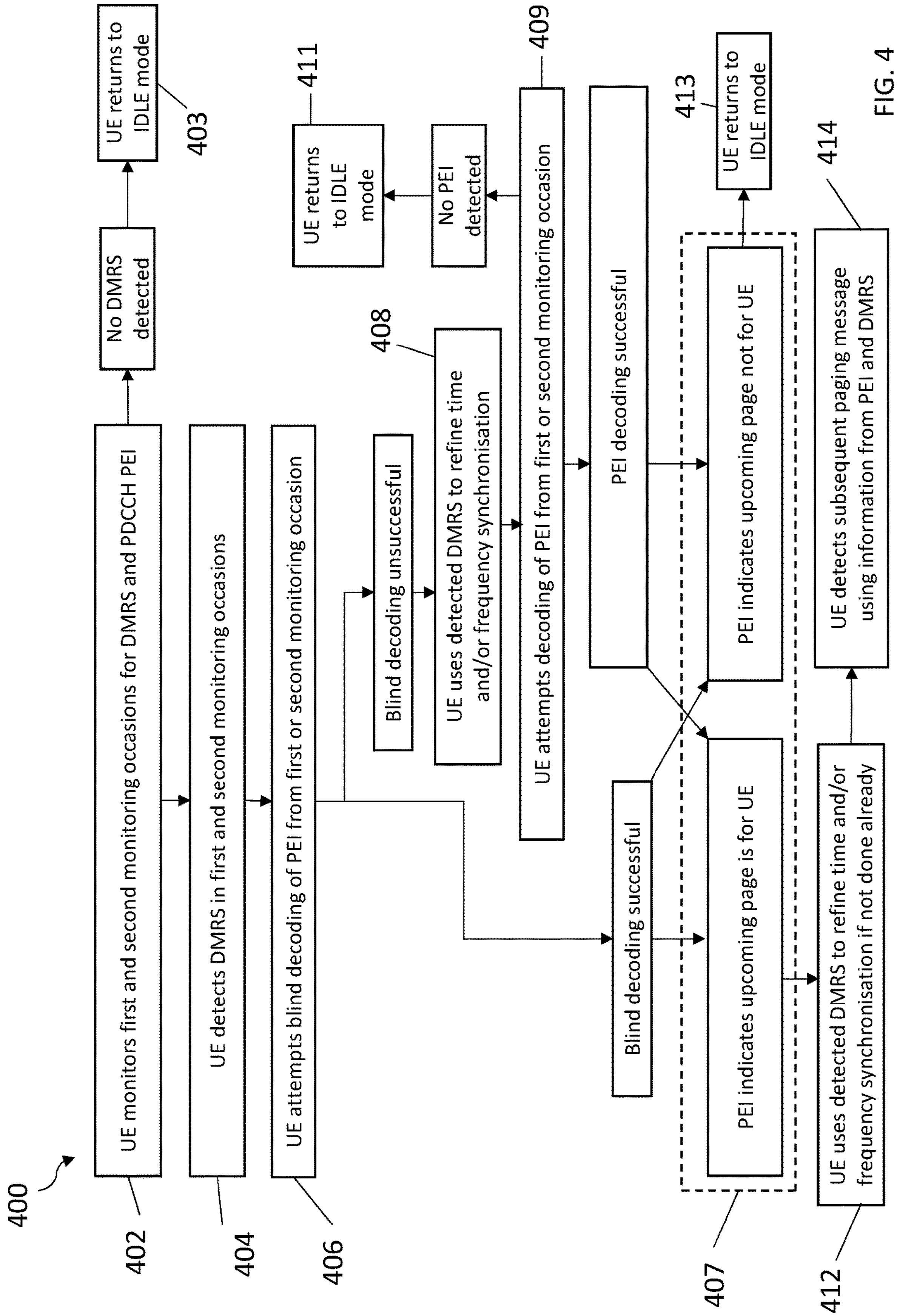
FIG. 4 is a flow diagram illustrating operation of a UE according to an embodiment of the present invention.

The operation of the gNB 102 and the UE 104 will now be explained with further reference to the flow diagram of FIG. 4. At step 402, the UE 104 wakes from an IDLE state and monitors a common search space associated with the CORESET 300 at the first monitoring occasion 206. The UE 104 attempts blind decoding of a number of PDCCH candidates defined by the search space in an attempt to detect the PDCCH PEI 302 and also monitors the search space for DMRS 310.

If no PEI monitoring burst 200 is transmitted by the gNB 102 (i.e. if there is no paging message imminent), the UE 104 does not detect DMRS 310 at either the first or second monitoring occasions (and does not succeed in blind decoding the PDCCH PEI 302 as it is not present). The UE 104 thus returns to the low power IDLE mode in step 403.

However, if a PDCCH payload (e.g. a PEI) is transmitted in either of the first and second monitoring occasions 206, 208 by the gNB 102, the UE 104 detects DMRS 310 at the first and second monitoring occasions in step 404. As mentioned above, the UE 104 is also attempting to blind decode a PDCCH PEI payload 302 in the search space in step 406. If the gNB 102 has transmitted a PEI and the synchronization of the UE 104 is sufficiently accurate, this blind decoding 406 is successful and the UE 104 proceeds immediately to determine, using the contents of the PEI payload 302, whether or not the upcoming paging message is intended for the UE 104 in step 407 (e.g. if the PEI payload 302 identifies a sub-group to which the UE 104 belongs).

Alternatively, if the synchronization of UE 104 is not sufficiently accurate, the blind decoding 406 is not successful. However, because the first subset of frequency bands in which the DMRS is transmitted has a large frequency span (in this case the whole frequency range of the CORESET 300), it is likely to be detected even if the time and frequency synchronization of the UE 104 is imperfect. At step 408 the UE 104 thus uses the detected wide-band DMRS 310 at the first and second monitoring occasions 206 to improve its synchronization. The UE 104 estimates a timing error by measuring a phase shift among sub-carriers within a DMRS symbol, and estimates a frequency error by measuring phase shift between sub-carriers in different DMRS symbols (i.e. between the first and second monitoring occasions 206, 208). The UE 104 then uses these estimates to improve its synchronization with the gNB 102. With this improved synchronization the UE proceeds to attempt decoding of the PEI payload 302 in step 409.

If this decoding is unsuccessful (e.g. there is no PEI payload), the UE returns to IDLE mode in step 411. However, if the decoding in step 409 is successful, the UE 104 proceeds to step 407 and determines whether or not the upcoming paging message is intended for the UE 104 in step 407 (e.g. if the PEI payload 302 identifies a sub-group to which the UE 104 belongs).

If in step 407 the PEI payload 302 indicates that the upcoming paging message is not for the UE 104, the UE 104 simply returns to the IDLE mode in step 413 to save power. However, if the PEI payload 302 indicates that the upcoming paging message is for the UE 104, the UE 104 proceeds to detect the subsequent paging message accordingly in step 414. If the blind decoding in step 406 was successful without needing to use the DMRS to improve the synchronization of the UE 104, the UE 104 now utilizes the DMRS to improve its synchronization in step 412 before detecting the paging message in step 414.

In this example, both the PEI payload 302 and the wide-band DMRS 310 are transmitted in the first and second monitoring occasions 206, 208. However, this is not essential and in some embodiments the PEI payload 302 may only be transmitted in one monitoring occasion per beam.

The operation of the gNB 102 and the UE 104 described above with reference to FIG. 4 is of course only one example of how the invention may be implemented. In other examples various steps of operation may be performed in a different order. For example, in some implementations the UE 104 may first attempt blind decoding of a PEI before attempting to detect DMRS.

Figure 5:
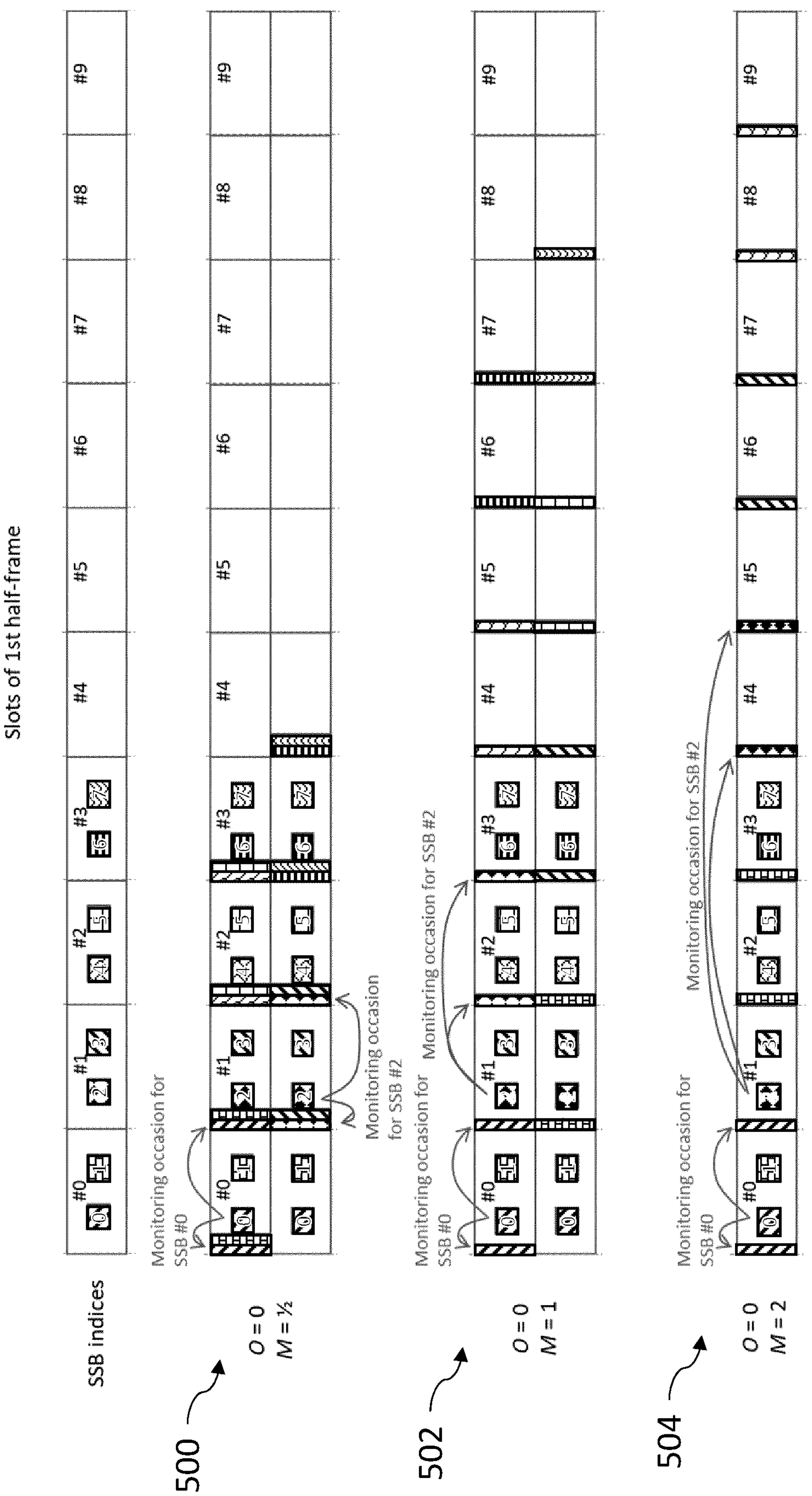
FIG. 5 is a diagram showing further examples of PEI monitoring bursts.

FIG. 5 shows the timing of PEI monitoring bursts 500, 502, 504 for the a PEI search space based on CSS #0, configured with parameters M and O. Depending on these parameters, monitoring occasions of a given beam are shifted relative to a corresponding synchronisation signal block (SSB) of the same beam. However, it will be noted that in each burst 500, 502, 504 there are always two monitoring occasions per beam which are fourteen symbols apart. Preferably, a gNB 102 using CSS #0 for PEI uses a pattern where the monitoring occasions of different used beams do not overlap. For example, if gNB 102 uses more than four beams, it may utilise monitoring burst 504. If gNB 102 uses less than four beams may configure utilise monitoring burst 500 or 502 (using, e.g., beams/SSBs indexed with 0, 2, 4 and 6). The beams used by the gNB 102 are indicated to the UE 104 using a parameter ssb—PositionsInBurst. Alternatively, a gNB 102 may allocate orthogonal beams for indices #0 and #1 and transmit PDCCH towards both beams simultaneously in the same symbol.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A radio receiver device for receiving radio signals according to an orthogonal frequency division multiplexing protocol on a plurality of frequency resources, wherein the radio receiver device is configured to:

detect a plurality of reference signals in a first subset of the plurality of frequency resources at a first monitoring occasion and a second, later, monitoring occasion;

monitor for paging information in a second subset of the plurality of frequency resources at one or more of the first and second monitoring occasions, wherein the first subset has a larger frequency span than the second subset; and use detected reference signals at the first and second monitoring occasions to synchronise the radio receiver device.

2. The radio receiver device of claim 1, configured to estimate a timing error of the radio receiver by measuring a phase shift between reference signals in different frequency resources at a single monitoring occasion.

3. The radio receiver device of claim 1, configured to estimate frequency error by measuring a phase shift between reference signals in the first and second monitoring occasions.

4. The radio receiver device of claim 1, wherein the first and second monitoring occasions are separated by four or more OFDM symbols.

5. The radio receiver device of claim 1, wherein the first and second monitoring occasions are separated by no more than 14 OFDM symbols.

6. The radio receiver device of claim 1, wherein the paging information comprises a paging early indication (PEI) comprising at least information regarding a presence of subsequent paging message.

7. The radio receiver device of claim 6, arranged to wake from a low power mode to monitor for the PEI in the first and/or second monitoring occasions.

8. The radio receiver device of claim 6, configured to further determine sub-group identification information from the PEI.

9. The radio receiver device of claim 1, configured to receive the paging information as a physical downlink control channel payload.

10. The radio receiver device of claim 1, wherein the first and second subsets of frequency resources are within the same control resource set.

11. The radio receiver device of claim 10, configured to monitor a search space corresponding to the control resource set to detect the paging information.

12. The radio receiver device of claim 1, wherein the plurality of reference signals comprise demodulation reference symbols.

13. The radio receiver device of claim 1, arranged to monitor first and second monitoring occasions for each of a plurality of beams.

14. A method of communication between a radio transmitter device and a radio receiver device using an orthogonal frequency division multiplexing protocol on a plurality of frequency resources, said method comprising:

the radio transmitter device transmitting a plurality of reference signals within a first subset of said plurality of frequency resources at a first monitoring occasion and a second monitoring occasion; and the radio transmitter device transmitting paging information within a second subset of said plurality of frequency resources at one or more of the first and second monitoring occasions, wherein the first subset has a larger frequency span than the second subset;

the radio receiver device detecting the plurality of reference signals at the first and second monitoring occasions;

the radio receiver device detecting the paging information; and the radio receiver device using reference signals detected at the first and second monitoring occasions to synchronise the radio receiver device.

15. A radio transmitter device for transmitting radio signals according to an orthogonal frequency division multiplexing protocol using a plurality of frequency resources, wherein the radio transmitter device is configured to:

transmit a plurality of reference signals within a first subset of said plurality of frequency resources at a first monitoring occasion and a second monitoring occasion; and transmit paging information within a second subset of said plurality of frequency resources at one or more of the first and second monitoring occasions, wherein the first subset has a larger frequency span than the second subset.

16. The radio transmitter device of claim 15, wherein the paging information comprises a physical downlink control channel (PDCCH) payload.

17. The radio transmitter device of claim 15, wherein the paging information comprises a paging early indication (PEI) comprising information regarding a subsequent paging message and the PEI comprises sub-group identification information.

18. The radio transmitter device of claim 15, wherein the first and second subsets of frequency resources are within the same control resource set.

19. The radio transmitter device of claim 15, configured to transmit the plurality of reference signals and the paging information for each of a plurality of beams.

20. The radio transmitter device of claim 15, configured to transmit paging information within the second subset of said plurality of frequency resources at both of the first and second monitoring occasions.

* * * * *